June 3, 1958 E. H. HEDDY 2,836,995
FISHING REEL TRANSMISSION
Filed April 11, 1955
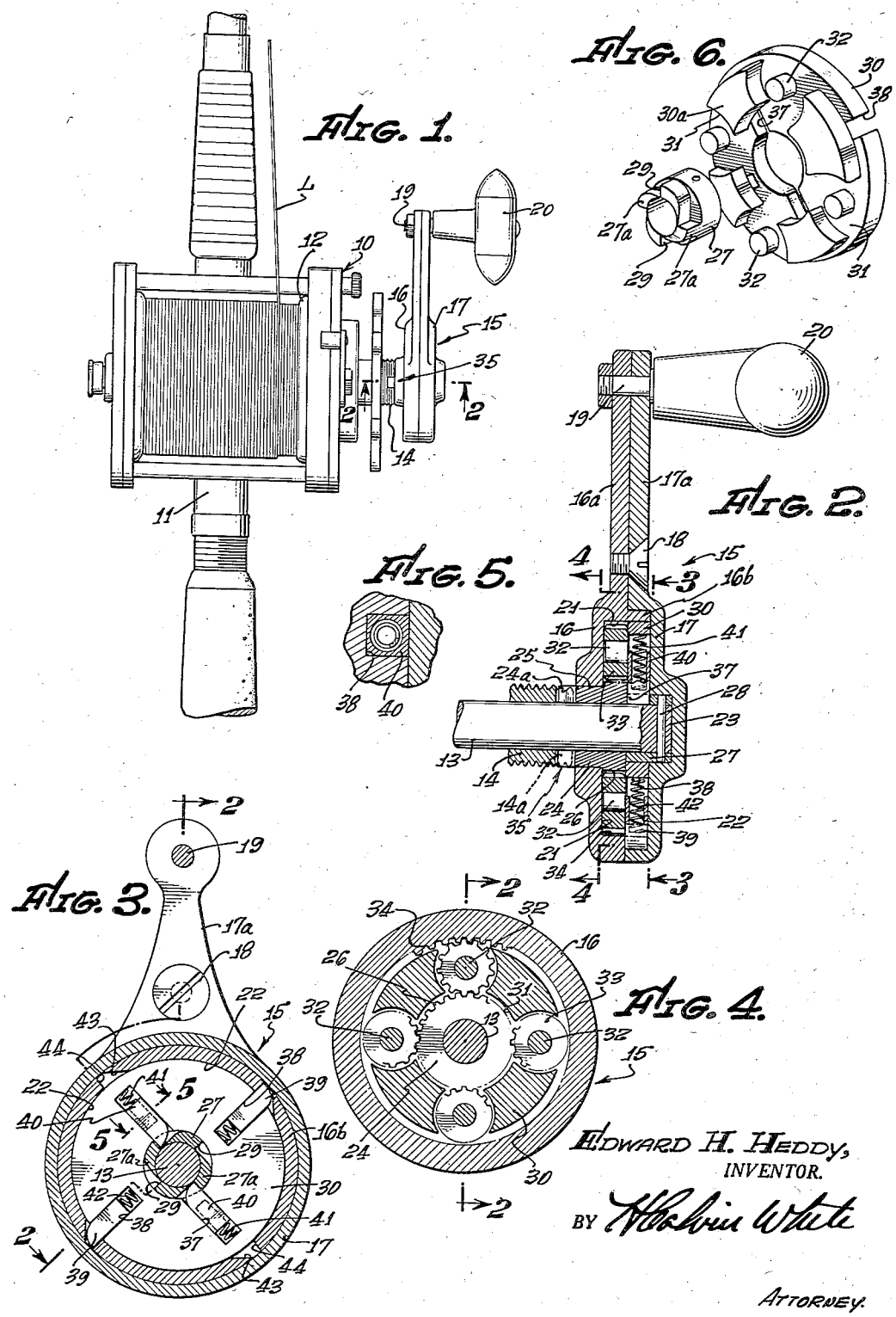
EDWARD H. HEDDY,
INVENTOR.
BY
ATTORNEY.

United States Patent Office 2,836,995
Patented June 3, 1958

2,836,995

FISHING REEL TRANSMISSION

Edward H. Heddy, Los Angeles, Calif.; Dorothy P. Heddy, executrix of said Edward H. Heddy, deceased Application April 11, 1955, Serial No. 500,399

9 Claims. (Cl. 74—812)

This invention has to do generally with improvements in fishing reels, and is directed particularly to two-speed fishing reels and to a novel transmission characterized by its ready adaptability or attachability to conventional reels, and by its complete simplification of the operations required for turning the reel at relatively slower and higher speeds in the same (winding) direction.

The general purpose of various known multiple speed fishing reel transmissions is of course to rotate the spooling reel at different speeds, i. e. slower when the line load is greater, and faster as the load reduces or the line slackens. Ordinarily the transmission is controlled by shift levers, buttons, slides and the like, separate and apart from the reel crank, so that often too excessive time and movements other than those required for the crank rotation, must be consumed for speed changes.

One of my major objects is to provide a novel transmission applicable to conventional reels and capable ot operation to selectively rotate the line reel in the same direction but at different speeds, by the simple and sole expedient of reversing the crank rotation.

Structurally, the invention has for its purpose to provide a transmission, virtually the whole of which is contained within the body of the operating crank which thus serves as a housing for the complete mechanism. Thus the transmission avoids any necessity for the use of reel-carried levers, buttons, knobs or the like, requiring manipulations to effect speed changes. In accordance with the invention, operation of the transmission requires merely conventional clockwise rotation of the crank to rotate the reel at a normal or slower speed, and rotation of the crank counterclockwise to transmit higher rotation speed to the reel.

In its later described form, the transmission contained within interconnected sections of the housing and its integral crank arm, comprises a gear hub or bearing rotatable on the conventional rigid reel shaft and engageable with the usual reel drag sleeve which rotates on the rigid shaft so that the gear hub and drag sleeve are rotatable together. Interposed between the housing and gear hub is a planetary gear assembly together with ratchet means whereby the gear assembly is caused to rotate bodily with the housing and at the same speed as the crank is turned in a clockwise direction, the ratchet means also being operative to in effect release the gear assembly for transmission of the housing rotation in an anti-clockwise rotation to the gear hub at an increased speed. Thus the ratchet means is self-responsive to cause transmission of the housing rotation to the drag sleeve at the housing speed during an initial normal and clockwise rotation of the crank, and being responsive merely to reverse rotation of the crank to transmit the housing rotation to the drag sleeve at increased speed.

All of the various features and objects of the invention, as well as the details of an illustrative embodiment, will be fully understood from the following detailed description of the accompanying drawing, in which:

Fig. 1 is a view showing in plan form a conventional fishing reel, with the present crank-contained transmission applied to the reel shaft;

Fig. 2 is an enlarged cross-section on line 2—2 of Fig. 1;

Fig. 3 is a section taken on line 3—3 of Fig. 2;

Fig. 4 is a section taken on line 4—4 of Fig. 2;

Fig. 5 is an enlarged fragmentary section taken on line 5—5 of Fig. 3; and

Fig. 6 is a view showing in perspective the floating gear and ratchet pin carrying disc, and also the reel shaft-carried ratchet sleeve.

Referring first ot the general showing of Fig. 1, the fishing reel generally indicated at 10, is shown to be mounted on the pole 11 and to have a line spool or reel 12 rotatable by a shaft means which includes, see Fig. 2, the usual rigid threaded drag and reel drive sleeve 14 rotatable on rigid shaft 13, both of which are conventional. It is to be understood that the showing of the reel assembly is to be regarded merely as typical of a wide variety of specific roll structures, and that the present invention is to be considered as being independent of the details of the reel assembly, other than with respect to its association with the rigid reel shaft 13 and rotatable drag sleeve 14.

The variable speed transmission, with which the invention is directly concerned, is contained within the crank body and arm assembly generally indicated at 15 and which in its preferred form to best and most simply accommodate the transmission, as the illustrated structure in Fig. 2. Here the crank is shown to be formed by two mating body sections 16 and 17, with their arm extensions 16a and 17a interconnected by screw 18 and a bolt 19 which pivotally mounts the handle knob 20 to the end of the crank. The body sections are annularly recessed or cavitated at 21 and 22 to thus serve as a housing for the later described mechanism contained therein. Section 17 is further cavitated centrally at 23 to receive the end of the reel shaft 13. Referring to Fig. 2, it will be noted that section 16 has an annular flange 16b projecting into recess 22 as a component of the later described ratchet device.

The body section 16 contains a gear sleeve or hub 24 rotatable on the shaft 13 and having rotational bearing engagement against the housing bore 25. The hub portion 24a within the body recess 21 is peripherally toothed at 26, see Fig. 4, to serve as a gear which engages with the later described planetary gears.

Adjacent hub 24 and contained within the body recesses 22 and 23, is a sleeve 27 secured to the shaft 13 by lock pin 28, the sleeve carrying a circular series of uniformly spaced ratchet teeth 27a, as shown in Figs. 3 and 6. These teeth present radial shoulders 29, typically at uniform 90° spacing, for engagement by the later described ratchet pins.

The body recess 22 contains a disc 30, which may be regarded as floating in the sense that it is rotatable relative to both the housing and the shaft 13. The inner face portion 30a of the disc projects into the body recess 21, and contains uniformly spaced recesses 31 centrally within which are contained pins or trunnions 32 formed integrally with the disc. Referring to Fig. 4, four planetary gears 33 rotatable on the trunnions 32 mesh both with the hub gear 26 and a ring gear 34 formed on the periphery of the housing recess 21. As will appear, rotation of the housing becomes transmitted to the drag sleeve 14 and thence to the fishing reel 12 by virtue of a terminal interconnection at 35 between the hub and drag sleeve, the interconnection being effected simply and conveniently by uniformly spaced, interfitting projections 24a and 14a on the ends of the hub and sleeve.

Referring now to Fig. 2, the outer face of the disc 30 is radially recessed at 37 and 38 to contain opposite throw spring-urged pins 39 and 40 urged respectively outwardly and inwardly by springs 41 and 42. The annular flange or projection 16b contains recesses 43 at 90° spacings to form ratchet shoulders 44 engageable by pins 39. Pins 40 are urged inwardly toward the shaft 13 to be engageable against the stationary sleeve ratchet shoulders 29.

For accommodation of the described transmission, the conventional drag sleeve 14 may be terminally slotted to form the projections 14a, and the shaft 13 drilled to receive the key pin 28. To apply the transmission assembly, the body sections 16 and 17 are separated and section 16 containing the disc 30 and gears 33 and 26 are applied to the reel shaft. Sleeve 27a then is slipped onto the shaft and pin 28 inserted. Next the ratchet pins 39 and 40 together with their springs, may be inserted into the disc recesses 37 and 38, and finally the body section 17 is put in place and secured by screws 18 and bolt 19 to section 16.

In considering the operation of the transmission, assume the crack to be rotated clockwise to spool the line L on the reel 12. The housing rotation is transmitted directly to disc 30 by reason of its becoming locked to flange 16b by the ratchet pin 39 bearing against shoulders 44. The resultant bodily rotation of the disc and planetary gears in effect lock the housing to bearing gears 24 so that the drag sleeve 14 is rotated at the same speed as the housing. When it is desired to increase the winding speed of the reel, it is only necessary to reverse the rotation of the crank, the effect of which is to engage the ratchet pins 40 against stationary sleeve shoulders 29, thereby locking the disc 30 against rotation and causing the housing to drive bearing gear 24 by way of the ring gear 34, and gears 33. The resulting transmission of the crank rotation to sleeve 14 produces rotation of the sleeve and reel at increased speed, i. e. faster than the housing rotation, and at a rate predeterminable by the gear ratios.

I claim:

1. For attachment to a fishing reel stationary shaft and drag sleeve rotatable thereon to wind a line, a housing connectible to said shaft and having an integral crank arm rotatable in opposite directions, a transmission within the housing operatively connectible to the drag sleeve and housing and including a first means operable to transmit clockwise rotation of the housing to the drag sleeve rotating the sleeve in a first direction at a relatively slow rate and second means for transmitting anti-clockwise rotation of the housing to said drag sleeve rotating the sleeve in said direction at a relatively increased rate, both of said means being operable solely by opposite rotations of the crank, inner and outer ratchet teeth carried by said shaft and housing respectively, and said first and second means including a body rotatable about said shaft between said inner and outer teeth and having radially extending recesses formed therein, first and second pawls movable in said recesses respectively toward said outer and inner teeth, and springs urging said first and second pawls into locking and sliding engagement with said outer and inner teeth respectively in response to clockwise housing rotation and said springs being operable to urge said first and second pawls into sliding and locking engagement with said outer and inner teeth respectively in response to anti-clockwise housing rotation.

2. For attachment to a fishing reel stationary shaft and drag sleeve rotatable thereon to wind a line, a housing connectible to said shaft and having an integral crank arm rotatable in opposite directions, a transmission within the housing operatively connectible to the drag sleeve and housing and including a first means operable to transmit clockwise rotation of the housing to the drag sleeve rotating the sleeve in a first direction at the same rotative speed as the housing and second means for transmitting anti-clockwise rotation of the housing to said drag sleeve rotating the sleeve in said direction at a rotative speed greater than that of the housing, both of said means being operable solely by reverse rotations of the crank, inner and outer ratchet teeth carried by said shaft and housing respectively, and said first and second means including a body rotatable about said shaft between said inner and outer teeth and having radially extending recesses formed therein, first and second pawls movable in said recesses respectively toward said outer and inner teeth, and springs urging said first and second pawls into locking and sliding engagement with said outer and inner teeth respectively in response to clockwise housing rotation and said springs being operable to urge said first and second pawls into sliding and locking engagement with said outer and inner teeth respectively in response to anti-clockwise housing rotation.

3. For attachment to a fishing reel stationary shaft and drag sleeve rotatable thereon to wind a line, a housing connectible to said shaft means and having an integral crank arm rotatable in opposite directions, said housing and crank being formed of interconnected sections containing openly opposed recesses, a transmission within the housing recesses operatively connectible to the drag sleeve and housing and including a first means operable to transmit clockwise rotation of the housing to the drag sleeve rotating the sleeve in a first direction at a relatively slow rate, and second means for transmitting anti-clockwise rotation of the housing to said drag sleeve rotating the sleeve in said direction at a relatively increased rate, both of said means being operable solely by a reverse rotations of the crank, inner and outer ratchet teeth carried by said shaft and housing respectively, and said first and second means including a body rotatable about said shaft between said inner and outer teeth and having radially extending recesses formed therein, first and second pawls movable in said recesses respectively toward said outer and inner teeth, and springs urging said first and second pawls into locking and sliding engagement with said outer and inner teeth respectively in response to clockwise housing rotation and said springs being operable to urge said first and second pawls into sliding and locking engagement with said outer and inner teeth respectively in response to anti-clockwise housing rotation.

4. For attachment to a fishing reel stationary shaft and drag sleeve rotatable thereon to wind a line, a housing connectible to said shaft means and having an integral crank arm rotatable in opposite directions, a transmission within and operatively connectible with the housing including a first means operable to transmit clockwise rotation of the housing to said drag sleeve rotating the sleeve in a first direction at a relatively slow rate and second means for transmitting anti-clockwise rotation of the housing to said drag sleeve rotating the sleeve in said direction at a relatively increased rate, both of said means being operable solely by reverse rotations of the crank, said transmission including a hub connectible with the drag sleeve of the reel, and also a transmission sleeve stationarily connectible with said shaft, inner and outer ratchet teeth carried by said transmission sleeve and housing respectively, and said means including a body rotatable about said shaft between said inner and outer teeth and having radially extending recesses formed therein, first and second pawls movable in said recesses respectively toward said outer and inner teeth, and springs urging said first and second pawls into locking and sliding engagement with said outer and inner teeth respectively in response to clockwise housing rotation and said springs being operable to urge said first and second pawls into sliding and locking engagement with said outer and inner teeth respectively in response to anti-clockwise housing rotation.

5. For attachment to a fishing reel stationary shaft and an encircling rotatable drag sleeve, a housing adapted to extend about the shaft terminal beyond the drag sleeve and having an integral crank arm rotatable in opposite directions, a transmission within and operatively connected with the housing including a hub and an alined transmission sleeve both to receive the shaft terminal, the hub being rotatively connectible with the drag sleeve and said transmission sleeve being stationarily connectible to the shaft, said transmission including a first means operable to transmit clockwise rotation of the housing to said hub rotating the hub in a first direction at the housing speed and a second means cooperating with said transmission sleeve for transmitting anti-clockwise rotation of the housing to said hub rotating the hub in said direction at an increased rate, both of said means being operable solely by reverse rotations of the crank, inner and outer ratchet teeth carried by said transmission sleeve and housing respectively, and said means including a body rotatable about said shaft between said inner and outer teeth and having radially extending recesses formed therein, first and second pawls movable in said recesses respectively toward said outer and inner teeth, and springs urging said first and second pawls into locking and sliding engagement with said outer and inner teeth respectively in response to clockwise housing rotation and said springs being operable to urge said first and second pawls into sliding and locking engagement with said outer and inner teeth respectively in response to anti-clockwise housing rotation.

6. For attachment to a fishing reel stationary shaft and an encircling rotatable drag sleeve, a housing adapted to extend about the shaft terminal beyond the drag sleeve, said housing being formed of interconnected sections containing openly opposed recesses and together forming a crank arm, a transmission within the housing recesses and operatively connected with the housing including a hub and an alined transmission sleeve both to receive the shaft terminal, the hub being rotatively connectible with the drag sleeve and the transmission sleeve being stationarily connectible to said shaft, said transmission including a first means operable to transmit clockwise rotation of the housing to said hub rotating the hub in a first direction at the housing speed and a second means cooperable with said transmission sleeve for transmitting anti-clockwise rotation of the housing to said hub rotating the hub in said direction at a speed greater than that of the housing, both of said means being operable solely by reverse rotations of the crank, inner and outer ratchet teeth carried by said transmission sleeve and housing respectively, and said means including a body rotatable about said shaft between said inner and outer teeth and having radially extending recesses formed therein, first and second pawls movable in said recesses respectively toward said outer and inner teeth, and springs urging said first and second pawls into locking and sliding engagement with said outer and inner teeth respectively in response to clockwise housing rotation and said spring being operable to urge said first and second pawls into sliding and locking engagement with said outer and inner teeth respectively in response to anti-clockwise housing rotation.

7. For attachment to a fishing reel stationary shaft and an encircling rotatable drag sleeve, a housing adapted to extend about the shaft terminal beyond the drag sleeve and having an integral crank arm rotatable in opposite directions, a transmission within and operatively connected with the housing including a gear hub and an alined transmission sleeve both to receive the shaft terminal, the hub being rotatively connectible with the shaft, said transmission including planetary gear means in the housing operable to transmit rotation of the housing to said hub, inner and outer ratchet teeth carried by said transmission sleeve and housing respectively, and said transmission including a body rotatable about said shaft between said inner and outer teeth and having radially extending recesses formed therein, first and second pawls movable in said recesses respectively toward said outer and inner teeth, and springs urging said first and second pawls into locking and sliding engagement with said outer and inner teeth respectively in response to clockwise housing rotation and said springs being operable to urge said first and second pawls into sliding and locking engagement with said outer and inner teeth respectively in response to anti-clockwise housing rotation.

8. For attachment to a stationary fishing reel shaft and an encircling rotatable drag sleeve, a housing connectible on the shaft for rotation thereon, a hub gear rotatable on the shaft within the housing and connectible with the drag sleeve to rotate same, a ratchet sleeve rigidly connectible to said shaft, a floating disc rotatable in the housing about the shaft, planetary gears carried by said disc meshing with and movable about said hub gear, a ring gear rotatable with the housing and surrounding and meshing with said planetary gears, inner and outer ratchet teeth carried by said ratchet sleeve and housing, said disc being rotatable between said inner and outer teeth and having radially extending recesses formed therein, first and second pawls movable in said recesses respectively toward said outer and inner teeth, and springs urging said first and second pawls into locking and sliding engagement with said outer and inner teeth respectively in response to clockwise housing rotation and said springs being operable to urge said first and second pawls into sliding and locking engagement with said outer and inner teeth respectively in response to anti-clockwise housing rotation.

9. An attachment as defined in claim 8 in which said housing is made in two sections having openly opposed recesses containing said gears and disc, and in which the housing has a crank arm extension.

References Cited in the file of this patent

UNITED STATES PATENTS

| | | |
|---|---|---|
| 523,221 | Mann | July 17, 1894 |
| 797,814 | Mimard | Aug. 22, 1905 |
| 2,054,823 | King | Sept. 22, 1936 |
| 2,467,627 | Olson | Apr. 19, 1949 |
| 2,487,387 | Sears et al. | Nov. 8, 1949 |
| 2,520,443 | Seaquist | Aug. 29, 1950 |
| 2,641,136 | Marsden et al. | June 9, 1953 |
| 2,713,274 | Lockwood | July 19, 1955 |